United States Patent [19]

Haraguchi et al.

[11] Patent Number: 4,968,600

[45] Date of Patent: Nov. 6, 1990

[54] APPARATUS FOR SEPARATING CELL SUSPENSION

[75] Inventors: Masato Haraguchi, Moriyama; Yuichi Mori; Ichiro Itagaki, both of Kamakura; Masao Hirose, Otsu, all of Japan

[73] Assignee: Toray Industries, Inc., Japan

[21] Appl. No.: 25,338

[22] Filed: Mar. 13, 1987

[30] Foreign Application Priority Data

Mar. 20, 1986 [JP] Japan .................................. 61-60780

[51] Int. Cl.[5] .......................... A01N 1/02; B01D 39/00
[52] U.S. Cl. ........................................ 435/2; 210/927; 210/500.21; 210/929; 604/4
[58] Field of Search .......................... 210/646, 650–655, 210/399, 500.21, 927, 929; 435/2; 604/4–6

[56] References Cited

U.S. PATENT DOCUMENTS

| | | | |
|---|---|---|---|
| 2,362,231 | 11/1944 | Ackerley | 210/399 |
| 2,734,015 | 2/1956 | Wettstein et al. | 210/645 |
| 4,069,151 | 1/1978 | Higley et al. | 604/5 |
| 4,071,444 | 1/1978 | Ash et al. | 604/5 |
| 4,191,182 | 3/1980 | Popovich et al. | 210/929 |
| 4,668,394 | 5/1987 | Badolato et al. | 604/5 |
| 4,713,176 | 12/1987 | Schoendorfer et al. | 210/645 |

FOREIGN PATENT DOCUMENTS 121956 1/1982 Japan.
155758 12/1983 Japan.

OTHER PUBLICATIONS

"The Shear Rate Filtration Rate Relationship of Membranes for Plasmapheresis", Leonard, *Plasmapheresis*, 1983, pp. 135–143.

Primary Examiner—Robert A. Wax
Assistant Examiner—T. J. Wallen
Attorney, Agent, or Firm—Austin R. Miller

[57] ABSTRACT

An apparatus for fractionating a cell suspension, which comprises a casing having a substantially columnar space in the interior, which is substantially closed to the space outside the casing, a liquid-treating chamber in the casing adapted to be filled with a cell suspension passing through this liquid-treating chamber, a separating membrane having a separating wall surface inside the casing and disposed to separate and cause a cell component to pass through the separating membrane, a rotary body rotatably arranged in the liquid-treating chamber, a driving mechanism for rotating and driving the rotary body, a cell suspension introduction path, a treated liquid discharge path, and a separated component discharge path.

30 Claims, 5 Drawing Sheets

APPARATUS FOR SEPARATING CELL SUSPENSION

BACKGROUND OF THE INVENTION

1. Field of the Invention

The present invention relates to an apparatus for fractionating a predetermined component from a continuously supplied liquid. More particularly, the present invention relates to a liquid fractionation apparatus which is preferably used, for example, for continuously fractionating a plasma component from blood continuously collected from a living body.

2. Description of the Related Art

In this specification, the term "liquid" denotes a cell suspension.

A known means for fractionating a liquid is a separating method using a separating membrane, and a specific apparatus for separating a plasma component from blood is disclosed in Japanese Unexamined Patent Publicaton No. 58-121956 (EP-85016-A) or Japanese Unexamined Patent Publication No. 59-155758 (EP-112152-A2).

The apparatus disclosed in the former reference (hereinafter referred to as "first conventional technique") utilizes an ordinary static membrane separation method and the apparatus disclosed in the latter reference (hereinafter referred to as "second conventional technique") uses this membrane separation method at the field where positive action is effected by a high shear rate and a centrifugal force. In order to produce this field at which such a positive action of the shear rate and centrifugal force is effected, there are used a secured cylindrical housing and a rotary spinner having a separating membrane bonded to the periphery thereof and rotated within the cylindrical housing at a certain distance from the housing wall.

Figure 3:
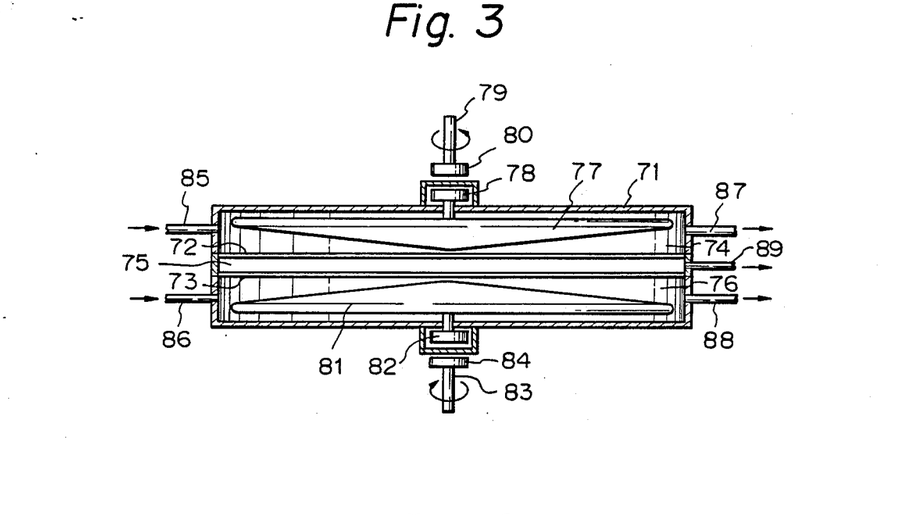
FIG. 3 is a diagram illustrating the longitudinal section of an apparatus according to another embodiment of the present invention.

An academic investigation of the shear rate to be applied in the separation of plasma from blood is reported in "Plasma-peresis", pages 135–143, published in 1983 by Raven Press, New York, and an experimental apparatus used during this investigation is illustrated in FIG. 3. This experimental apparatus (hereinafter referred to as "third conventional technique") comprises a blood cup for containing blood therein, a plane separating membrane secured to the lower portion of the blood cup, a space for receiving and discharging the plasma component provided below the separating membrane, and a conical body convex to and disposed rotatably above the separating membrane, spacedly therefrom within the blood cup. In this experimental apparatus, an amount of blood necessary for one experiment is contained in the blood cup.

In the first conventional technique using the static membrane separating method, a hollow fiber bundle comprising many hollow fibers is used as the separating membrane, and a separating surface area of 1000 to 3000 $cm^2$ is necessary. Accordingly, the first conventional technique is disadvantageous in that the size of the apparatus is inevitably increased, the structure of the apparatus is complicated, and since large quantities of hollow yarns are used, the apparatus becomes expensive. Moreover, the amount of liquid resident in the apparatus is large in proportion to the large separating surface area, and especially when blood is the object of the treatment, the quantity of the blood withdrawn from the body is increased and there arises another serious problem in that the properties of blood are changed by contact between a large quantity of blood and the separating material, which is a material different from the living body. It is considered in principle that the blood flow rate through the hollow fibers is increased to increase the shear rate. In this case, however, the flow resistance is abruptly increased upon circulation through the hollow fibers, and the pressure supplied to the apparatus must be proportionally increased, with the result that a serious accident such as destruction of blood cellular components or flow-out of blood by breakage of the hollow fibers is readily caused.

In the second conventional technique using the membrane separation method under the action of the high shear rate and centrifugal force, in order to produce the field at which both the shear rate and the centrifugal force act, it is necessary to increase the diameter of the rotary spinner, and a problem of an increase in the size of the apparatus arises, and thus a structural problem arises in that the separated plasma must be taken out through the rotation shaft of the rotary spinner. More important is that, since centrifugal force is utilized, Taylor vortexes are readily generated in the liquid-treating zone of the apparatus, and especially where the liquid to be treated is blood, the turbulence of the blood flow due to Taylor vortexes induces the destruction of platelets. Moreover, since excessive pressure must be applied to the separating membrane against the centrifugal force, an excessive supply pressure is proportionally provided and an accident is likely involving a flow-out of blood by breakage of the introduction tube.

A batchwise apparatus is used in the third conventional technique, but in this technique blood is subjected to a shear rate in the blood cup for a long time and, therefore, a problem of destruction of platelets arises. Furthermore, this is an open system apparatus in which blood to be treated is contained in a blood cup which is exposed to the open air. Accordingly, in a continuous treatment blood, a problem of the air content of blood arises. Moreover, this conventional technique is defective in that a pump must be provided for each system including the supply system, the discharge system, and the filtrate system, and thus it is impossible to set the filtration pressure in an optional manner.

SUMMARY OF THE INVENTION

It is a primary object of the present invention to solve the problems of the conventional techniques and provide an apparatus for continuously fractionating a liquid for separating a predetermined component from a continuously supplied liquid, especially a small-sized, disposable, economically advantageous apparatus for fractionating blood, which is preferably used for blood-collecting.

In accordance with one aspect of the present invention, this object can be attained by an apparatus for fractionating a cell suspension, which comprises (a) a case body having a substantially columnar space in the interior thereof, which is substantially closed to the outside, (b) a liquid-treating chamber disposed in the case body and filled with the liquid flowing therethrough, (c) a separated component chamber disposed in the case body, (d) a separating membrane with a separating wall surface having a certain area, which is interposed between the liquid-treating chamber and the separated component chamber to separate a predetermined component and allow the component to pass therethrough, (e) a disc-like rotary body with a shearing wall surface of a certain area confronting the separating wall surface at a certain distance, which is rotatably disposed in the liquid-treating chamber, (f) a driving mechanism engaged with the rotary body to rotate and drive the rotary body, (g) a liquid introduction path connected to the liquid-treating chamber and extended to the outside of the case body, (h) a treated liquid discharge path connected to the liquid-treating chamber and extended to the outside of the case body, and (i) a separated component liquid discharge path connected to the separated component chamber and extended to the outside of the case body.

In accordance with the another aspect of the present invention, the above-mentioned object is attained by an apparatus for fractionating a cell suspension, which comprises (a) a case body having a substantially columnar space in the interior thereof, which is substantially closed to the outside, (b) a liquid-treating chamber disposed in the case body and filled with the liquid circulating therethrough, (c) a shearing wall surface having a certain area formed on a part of the inner wall surface of the liquid-treating chamber, (d) a separating membrane with a separating wall surface having a certain area which confronts the shearing wall surface at a certain distance, the membrane being disposed to separate a predetermined component and allow the component to pass therethrough, (e) a disc-like rotary body supporting the separating membrane and having a separated component chamber on the back surface of the separating membrane, which is rotatably arranged in the liquid-treating chamber, (f) a driving mechanism engaged with the rotary body to rotate and drive the rotary body, (g) a liquid introduction path connected to the liquid-treating chamber and extended to the outside of the case body, (h) a treated liquid discharge path connected to the liquid-treating chamber and extended to the outside of the case body, and (i) a separated component liquid path connected to the separated component chamber and extended to the outside of the case body.

DESCRIPTION OF THE PREFERRED EMBODIMENTS

As the separating membrane effectively used in the present invention, there can be mentioned membranes capable of fractionating a predetermined component from a cell suspension at the field where a shear rate is imposed. For example, not only known separating membranes effective for the fractionation of liquids under the above condition but also separating membranes, effectively used for the fractionation of liquids under the above condition, which are now being developed or will be developed in the future, can be used. As the membrane material, there can be mentioned polycarbonates, cellulose mixed esters, polyethylene, polysulfones, and ceramics. Preferably, the permeation pore diameter of the separating membrane is 0.2 to 1.0 $\mu$m, especially 0.4 to 0.8 $\mu$m.

In the apparatus of the present invention, preferably, the area of the separating wall surface of the separating membrane is 10 to 100 cm$^2$.

In the present specification, the term "shearing wall surface" denotes a wall surface having an action such that a motion is given to a liquid filled between this wall surface and the separating wall surface of the separating membrane, and a shear rate is produced between the liquid and the separating wall surface by this motion.

In the apparatus of the present invention, where each of the shearing wall surface and the separating wall surface is a plane surface, the preferred distance between these plane surfaces is 0.05 to 2 mm and the diameter is 30 to 100 mm. Where at least one of the shearing wall surface and the separating wall surface has a conical surface convex to the confronting wall surface, the crossing angle formed between both wall surfaces is preferably selected in the range of from 0.5° to 5°, especially from 0.8° to 3°, and preferably, the diameter of the conical surface is 20 to 100 mm.

In the apparatus of the present invention, preferably the separating wall surface is a plane surface and the confronting shearing surface is a conical surface.

In the apparatus of the present invention, preferably the shear rate adopted is 1000 to 3000 sec$^-$.

Furthermore, when the apparatus of the present invention is used, preferably the rotation number of the rotary member is adjusted to 500 to 5000 rpm.

In the apparatus of the present invention having the above-mentioned structure, the rotary body is rotated in the closed liquid chamber by an appropriate rotation drive source, and the liquid to be treated is continuously introduced between the shearing wall surface of the rotary body and the separating wall surface formed by the separating membrane located at a position confronting or between the separating wall surface of the separating membrane possessed by the rotary body and the shearing wall surface of the liquid-treating chamber through a liquid introduction path connected to the liquid-treating chamber, and while the introduced liquid is filled in the liquid-treating chamber and flows therein, the liquid to be treated in the treating space between the shearing wall surface and the separating wall surface receives a rotational movement generated by the rotation of the shearing wall surface or receives a rotational movement against the shearing wall surface by the rotation of the separating wall surface, and a shear rate is produced between the liquid and the separating wall surface. Under this shear rate, a predetermined component is separated from the liquid through the separating membrane according to the capacity of the separating membrane, and the separated component flows into the separated component chamber and is discharged from the separated component discharge path connected to the separated component chamber. The separated component is collected in an appropriate receiving vessel. On the other hand, superfluous liquid in the liquid-treating chamber (which consists mainly of liquid remaining after separation of the predetermined component) is discharged through the treated liquid discharge path connected to the liquid-treating chamber and is collected in an appropriate receiving vessel. Note, if necessary, the collected liquid is fed back directly or through the above-mentioned liquid passage, while temporarily stopping the fractionating operation, and is returned to the system where the liquid to be treated is continuously collected.

Preferred embodiments of the apparatus of the present invention will now be described with reference to the accompanying drawings.

Figure 1:
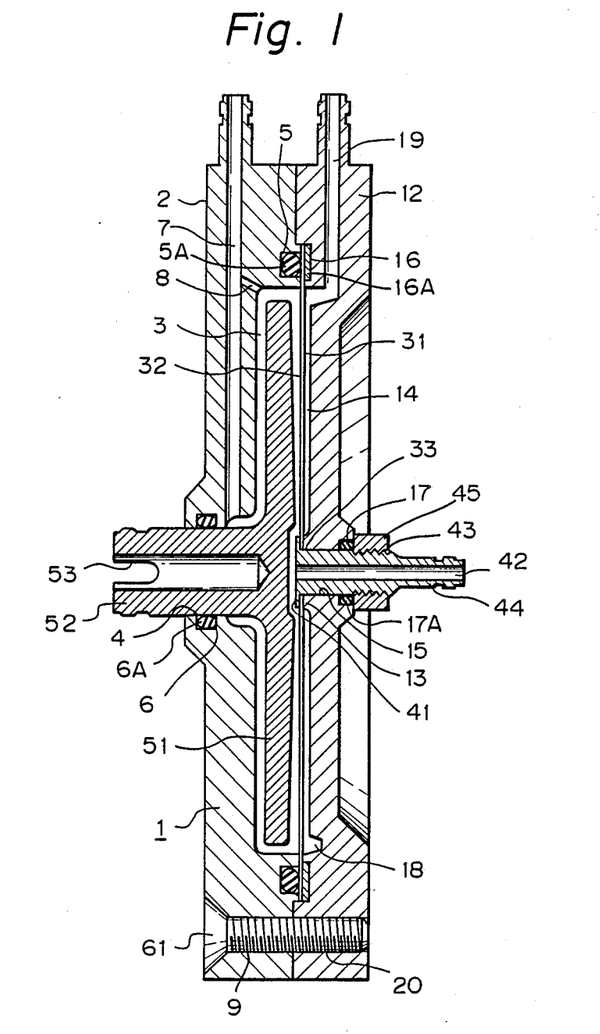
FIG. 1 is a diagram illustrating the longitudinal section of a cell suspension-fractionating apparatus according to one embodiment of the present invention.
Figure 2:
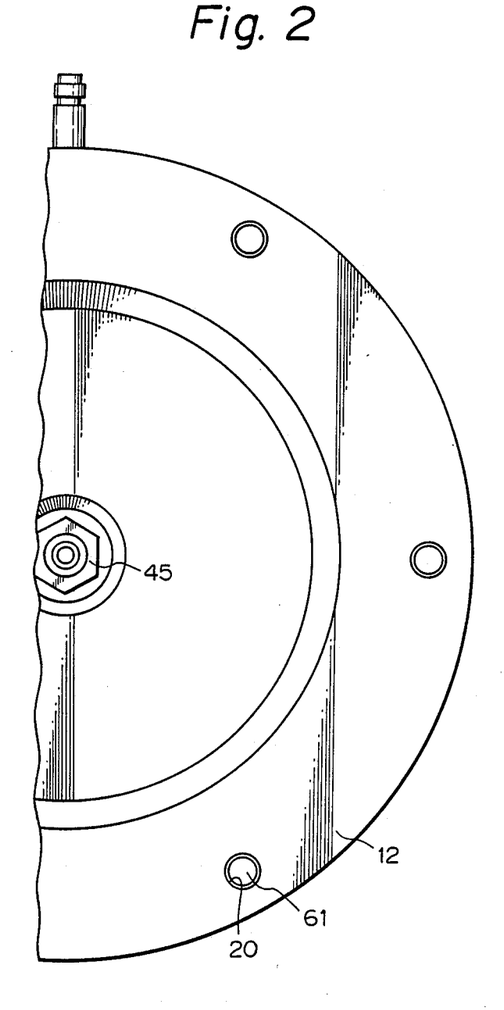
FIG. 2 is a side view showing the right side half of the apparatus shown in FIG. 1.

FIG. 1 is a diagram illustrating a liquid-fractionating apparatus according to one embodiment of the present invention, and FIG. 2 is a side view showing the right side half of the apparatus shown in FIG. 1.

A separating chamber 1 having a liquid-treating chamber and a separated liquid chamber therein comprises a cabin 2 composed of a polycarbonate and a cover 12 composed of a polycarbonate.

Formed on the right side face (in FIG. 1) of the cabin 2 is a circular concave portion (liquid-treating chamber) 3, and an axial hole 4 is extended from the left side face and piercing through the concave portion 3 at the center thereof. An annular groove 5 for an O-ring is formed on the right side end face of the peripheral edge portion of the cabin 2 and a groove 6 for an O-ring is formed in the intermediate portion of the axial hole 4. Formed in the cabin 2 is a treated liquid discharge path 7 having one end open to the concave portion 3 in the vicinity of the axial hole 4 and the other end open to the outer peripheral face of the cabin 2. A fluid path 8 connected to the treated liquid discharge path 7 is formed on the top end (in FIG. 1) of the concave portion 3. Formed in the peripheral edge portion of the cabin 2 are a plurality of bolt holes 9 piercing the left and right end faces.

A circular annular concave portion 14 forming a separated component chamber having a top 13 at the center thereof is formed on the left side face (in FIG. 1) of the cover 12, and a tubular insertion hole 15 extended from the right side face and piercing the concave portion 14 at the center thereof is formed. An annular groove 16 for a packing ring is formed on the left end face of the cover 12, around the outside edge of the separated component chamber which is formed by the concave portion 14. Furthermore, a notch 17 for an O-ring is formed on the right side end of the insertion hole 15, a liquid-collecting groove 18 is formed ground the outer peripheral edge of the concave portion 14 of the cover 12, and a separated component discharge path 19 having one end open to the liquid-collecting groove 18 and the other end open to the outer peripheral face of the cover 12 is formed. A plurality of bolt holes 20 piercing the left and right end faces are formed in the peripheral edge portion of the cover 12; the number of bolt holes 20 corresponding to the number of bolt holes 9.

A substantially flat circular perforated plate 31 formed of stainless steel is secured on the left end face of the cover 12, to cover the concave portion 14, and a circular separating membrane 32 formed of a polycarbonate, which defines the separating wall surface, is arranged on the surface of the perforated plate 31 on the side opposite to the side facing the concave portion 14. The outer peripheral edges of the perforated plate 31 and separating membrane 32 are located on packing 16A inserted in the packing groove 16 of the cover 12, and the central portions of the perforated plate 31 and separating membrane 32 have a insertion hole 33 and are located on the top 13 of the cover 12.

A nozzle 44 having a flange 41 on one end, a feeding liquid introduction path 42 piercing the central portion thereof, and a nut-screwing screw groove 43 on a part of the peripheral face is inserted in the insertion holes 15 and 33 while pressing against the separating membrane 32 and perforated plate 14 by the flange 41. The nozzle 44 is clamped to the cover 12 by a nut 45 screwed to the screw groove 43 while pressing an O-ring 17A inserted in the notch 17 for the O-ring, whereby the nozzle 44 is integrated with the cover 12.

A rotary body (rotor) 51 consisting of a board-like cone formed of a polycarbonate, which is convex to the separating membrane 32, is contained within the concave liquid treating chamber 3 of the cabin 2, and the conical right side face (in FIG. 1) of the rotary body 51 defines the shearing wall surface, and a rotation shaft 52 is extended from the left side face of the rotary body 51 and the rotation shaft 52 has on the top end thereof a connecting portion 53 for connection to a separately arranged rotation drive source (not shown). The rotation shaft 52 is inserted in the axial hole 4 of the cabin 2 and projected from the left side face of the cabin 2. The O-ring 6A fitted to the O-ring groove 6 is interposed between the rotation shaft 52 and the axial hole 4.

The rotary body 51 is contained within the concave portion 3 of the cabin 2, and the left side face of the cover 12 to which the separating membrane 32, perforated plate 31 and nozzle 44 are secured, is engaged with and clamped to the right side face of the cabin 2 having the O-ring 5A inserted in the O-ring groove 5 by means of a bolt 61 inserted in the bolt holes 9 and 20, whereby the cabin 2 is integrated with the cover 12. The liquid treating chamber is defined by the concave portion 3 of the cabin 2 and the separating membrane 32. The space surrounded by the concave portion 14 of the cover 12 and the separating membrane 32 constitutes the separated component chamber. The shearing wall surface of the rotary body 51 is rotatably located at a certain distance from the separating wall surface of the separating membrane 32.

For reference, dimensions of the main parts of the apparatus according to the present embodiment will now be described. This apparatus is designed as a means for separating plasma from blood. The angle between the plane rectangular to the axis of the rotation shaft 52 of the rotary body 51 and the conical face of the rotary body 51 is a specific angle within the range of from 0.5° to 5°. The diameter of the rotary body 51 is about 75 mm, and the distance in the axial direction between the top of the cone of the board-like portion of the rotary body 51 and the back face of this board-like portion is about 4 mm. The depth of the concave portion of the cabin 2 is about 7 mm and the diameter of the concave portion 3 is about 78 mm. The depth of the concave portion 14 of the cover 12 is about 1 mm and the diameter of the concave portion 14 is about 78 mm. The diameter of the separating chamber formed by integrating the cabin 2 with the cover 12 about 112 mm and the thickness is about 22 mm. The thickness of the separating membrane 32 is about 10 $\mu$m, the average diameter of the pore is about 0.4 $\mu$m, the fraction of pores is about 13 %, and the thickness of the perforated plate 31 is about 0.5 mm. The distance between the top end of the cone of the board-like portion of the rotary body 51 (in the rotary body shown in FIG. 1, the top end is cut and deformed but the top end referred to herein means the top end of a complete cone) and the separating wall surface of the separating membrane is about 0.1 mm.

The operation of the apparatus according to the present embodiment will now be described with reference to the operation of separating plasma while collecting blood.

The apparatus according to the present invention is used in the state shown in FIG. 1, that is, the state where the rotation axis of the rotation shaft 52 is arranged in the horizontal direction, and a blood-collecting tube (not shown) connected to the vein of a rabbit (not shown) is connected to the nozzle 44 having the liquid introduction path 42. If necessary, a chemical, for example, an anti-coagulant for blood, is added at a point midway of the blood-collecting tube. Blood flowing into the liquid-treating chamber (concave portion) 3 from the liquid introduction path 42 of the nozzle 44 is filled and fluidized in the liquid-treating chamber (concave portion) 3 and is collected in an appropriate vessel (not shown) through a treated liquid discharge tube (not shown) connected in advance to the treated liquid discharge path 7. At this initial state, the gas in the liquid-treating chamber (concave portion) 3 is discharged into said tube through the fluid path 8 formed on the upper end of the liquid-treating chamber (concave portion) 3. After discharge of the gas or before completion of discharge of the gas, the rotation shaft 52 coupled to an appropriate rotation drive source (not shown) by a one-touch system is rotated by this rotation drive source and blood continuously supplied to the center of the liquid-treating chamber (concave portion) 3 from the liquid introduction path 42 flows continuously between the shearing wall surface and the separating wall surface. A rotational movement is given to the blood by the rotation of the shearing wall surface and by this movement, a shear rate is produced to act on the blood and the separating wall surface. Under the action of this shear rate, a plasma component is allowed to pass through the separating membrane 32 and then through holes of the perforated plate 31, and the plasma component flows into the separated component chamber (annular concave portion) 14 and is continuously collected in an appropriate vessel (not shown) from a separated component discharge tube (not shown), connected beforehand to the separated component discharge path 19, through the separated component discharge path 19 and the tube. On the other hand, the blood in the liquid-treating chamber (concave portion) 3, that is, mainly the blood from which the plasma component has been separated, is passed through the treated liquid discharge path 7 and is continuously collected in an appropriate vessel (not shown) from a treated liquid discharge tube (not shown) connected beforehand to the treated liquid discharge path 7. The main treatment conditions are as described below. That is, the feed rate of blood to the liquid introduction path 42 is about 50 ml/min, and the rotation speed of the rotary body 51 is adjusted to about 3000 rpm.

In the apparatus according to the present embodiment, the shearing wall surface is a conical surface which is convex to the separating wall surface and the separating wall surface is a circular plane. However, other combinations of the shearing wall surface and the separating wall surface can be adopted. For example, there can be mentioned a combination of the shearing wall surface which is a circular plane and the separating wall surface which is convex to the shearing wall surface, a combination of the separating wall surface which is convex to the shearing wall surface and the shearing wall surface which is convex to the separating wall surface, a combination of the shearing wall surface which is a circular plane and the separating wall surface which is a circular plane, and slight modification thereof. However, the penultimate combination is not preferred where a strict uniformity of the shear rate at the positions in the radial direction of the shearing wall surface is required In the apparatus according to the present embodiment, the treating mechanism comprises a pair of one separating wall surface and one shearing wall surface. A plurality of pairs of these treating wall surfaces may alternatively be disposed in the apparatus. An embodiment comprising two pairs of the treating wall surfaces is illustrated in FIGS. 3 and 4.

FIG. 3 is a diagram illustrating the longitudinal section of another embodiment of the apparatus of the present invention. Referring to FIG. 3, the apparatus comprises a substantially cylindrical case body 71 having upper and lower ends and having a height smaller than the diameter thereof, where the interior of the case body 71 is divided into three chambers by two separating membranes 72 and 73. Namely, a first liquid-treating chamber 74, a separated component chamber 75, and a second liquid-treating chamber 76 are formed in order from the top (FIG. 3). A disc-like conical rotary body 77 is rotatably attached to and supported on the case body 71 in the first liquid-treating chamber 74 and a magnet 78 is attached to the top face (FIG. 3) of the rotary body 77. Outside the case body 71, a magnet 80 is attached to a rotation shaft 79 to confront the magnet 78. By rotating the rotation shaft 79 by an appropriate rotation drive source (not shown), the rotation of the magnet 80 is transmitted to the magnet 78 to rotate the rotary body 77 in the first liquid-treating chamber 74. Similarly, in the second liquid-treating chamber 76, a disc-like conical rotary body 81 is rotatably attached to and supported on the case body 71, and a magnet 82 is attached to the lower face (in FIG. 3) of the rotary body 81. Outside the case body 71, a magnet 84 is attached to a rotation shaft 83 to confront the magnet 82. By rotating the rotation shaft 83 by an appropriate rotation drive source (not shown), the rotation of the magnet 84 is transmitted to the magnet 82 to rotate the rotary body 81 in the second liquid-treating chamber 76. First and second liquid introduction paths 85 and 86 are connected to one side of each of the first and second liquid-treating chambers 74 and 76, and first and second treated liquid discharge paths 87 and 88 are connected to the other side of each of the first and second liquid-treating chambers 74 and 76. A separated component discharge path 89 is connected to the separated component chamber 75. The structural elements represented by the same names as in the apparatus shown in FIGS. 1 and 2 have substantially the same structure and material as the structural elements illustrated in FIGS. 1 and 2. Liquids to be supplied to the first liquid introduction path 85 and second liquid introduction path 86 in the apparatus shown in FIG. 3 may be the same or different.

Figure 4:
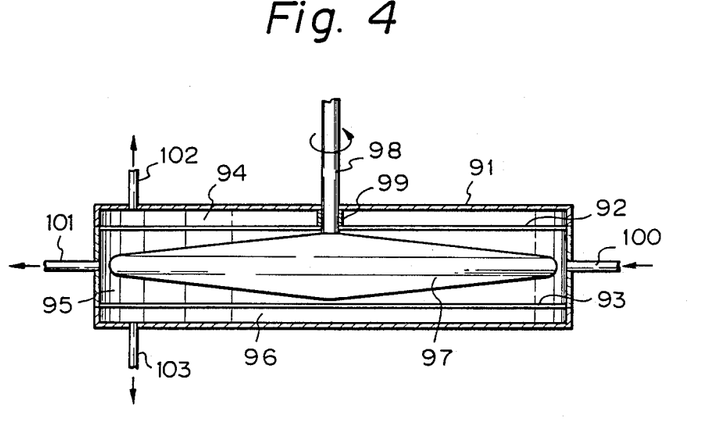
FIG. 4 is a diagram illustrating the longitudinal section of an apparatus according to still another embodiment of the present invention.

FIG. 4 is a diagram illustrating the longitudinal section of an apparatus according to still another embodiment of the present invention. Referring to FIG. 4, the apparatus as a whole comprises a cylindrical case body 91 having closed at the upper and lower ends thereof and a height smaller than the diameter thereof, and the interior of the case body 91 is divided into three chambers by two separating membranes 92 and 93. Namely, a first separated component chamber 94, a liquid-treating chamber 95, and a second separated component chamber 96 are formed in order from the top (in FIG. 4). In the liquid-treating chamber 95, a conical rotary body 97 having conical portions on the top and bottom of a disc is rotatably attached to and supported on the case body 91, and a rotation shaft 98 secured to the top of the upper cone of the rotary body 97 is rotatably fitted in an axial hole 99 formed to pierce the first separated component chamber 94 and is projected outside the case body 91 to be engaged with an appropriate rotating drive source (not shown). A liquid introduction path 100 and a treated liquid discharge path 101 are connected to the liquid-treating chamber 95, and a first separated component discharge path 102 and a second separated component discharge path 103 are connected to the first separated component chamber 94 and the second separated component chamber 96, respectively. The structural elements represented by the same names as in the apparatus shown in FIGS. 1 and 2 have substantially the same structure and are substantially formed of the same material as in the apparatus shown in FIGS. 1 and 2. Note, in the apparatus shown in FIG. 4, the separating members 92 and 93 defining the first and second separated component chambers 94 and 96 may have the same or different structure and material. The angle between the top face of the conical rotary body 97 and the horizontal plane of the cone may be the same or different from the angle between the bottom face of the conical rotary body 97 and the horizontal plane of the cone.

Note, the operation and function of the apparatuses shown in FIGS. 3 and 4 are substantially the same as those of the apparatus shown in FIGS. 1 and 2.

Figure 5:
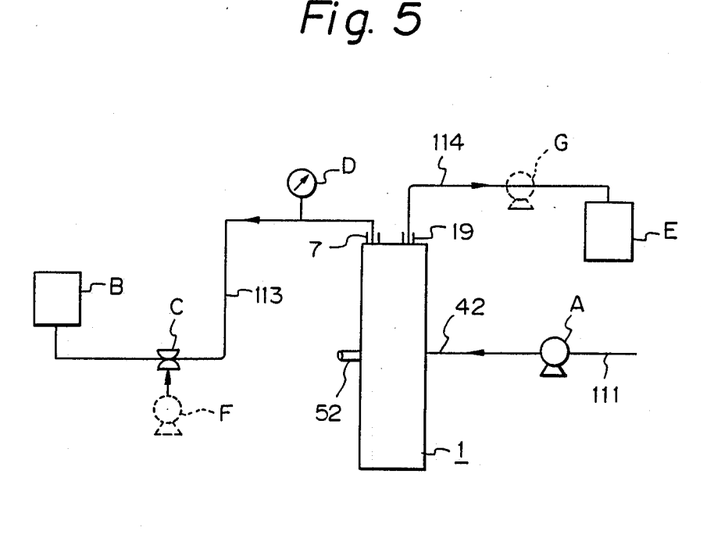
FIG. 5 is a diagram illustrating a blood-collecting system to which the apparatus of the present invention is applied.

FIG. 5 is a schematic diagram illustrating an example of a blood-collecting system in which the apparatus of the present invention is utilized. In this blood-collecting system, the apparatus shown in FIG. 1 is used for fractionating a liquid (blood). This fractionating apparatus comprises a separating chamber 1, as shown in FIG. 1, and in this separating chamber 1, there are disposed a rotation shaft 52, a liquid (blood) introduction path 42, a treated liquid (treated blood) discharge path 7, and a separated component (mainly a plasma component) discharge path 19, as shown in FIG. 1. A blood flow path 111 is connected to the blood introduction path 42 and a pump (roller pump) A is interposed in the blood flow path 111. A treated blood flow path 113 is connected to the treated blood discharge path 7 and a treated blood-containing bag B is connected to the end of the path 113. A clamp mechanism C is interposed at a point midway of the path 113 and a pressure gauge D is arranged to extend from the clamp mechanism C toward the separating chamber 1. A plasma component flow path 114 is connected to the plasma component discharge path 19, and a plasma component-containing bag E is connected to the end of the path 114. In this system, the liquid-treating chamber (blood chamber) in the separating chamber 1 is compressed by the pump A to impart a pressure to the separating membrane in the separating chamber 1. By this pressure and the shearing force generated by the rotary body rotating in the separating chamber 1 and imposed on the separating membrane, the plasma component is fractionated and is stored in the plasma-containing bag E. The pressure in the separating chamber 1 is detected by the pressure gauge D. A control system (not shown) for automatically adjusting the degree of opening of the clamp C or the number of rotations of the pump A according to the detecting signal of the pressure gauge D may be disposed to inspect the fractionating operation in the separating chamber and simultaneously adjust the fractionating operation automatically. Note, if a pump F (indicated by a dotted line in parallel to the clamp C in FIG. 5) similar to the pump A is disposed instead of the clamp C to discharge the treated liquid, the pressure in the separating chamber 1 can be reduced, and the problem of hemolysis or leakage of blood from the tube because of a high pressure can be moderated or completely eliminated. Note, in the case where the treated blood in the treated liquid containing bag B is fed back and returned to the blood vessel, it is sufficient if the pump A and the pump F disposed instead of the clamp C are reversely rotated. A control system (not shown) for automatically controlling these pumps according to the detection signal of the pressure gauge D may be disposed to automatically control these pumps. Furthermore, by arranging a pump G indicated by a dot line in FIG. 5 in the plasma component flow path 114, the operation pressure in the separating chamber 1 may be further reduced and the flow rate of the plasma component may be controlled.

Note, preferably the pressure difference between the liquid-treating chamber and the separated component chamber is about 10 to about 50 mmHg.

Figure 6:
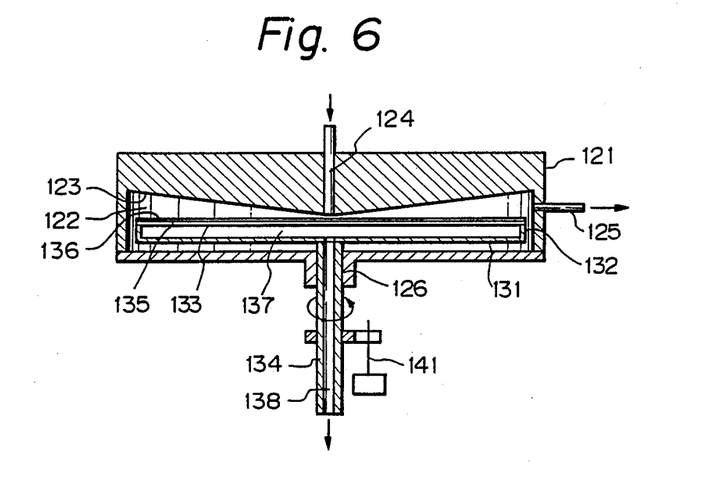
FIG. 6 is a diagram illustrating the longitudinal section of a cell suspension-fractionating apparatus according to still another embodiment of the present invention; and, FIG. 7 is a diagram illustrating the longitudinal section of an apparatus according to still another embodiment of the present invention.
Figure 7:
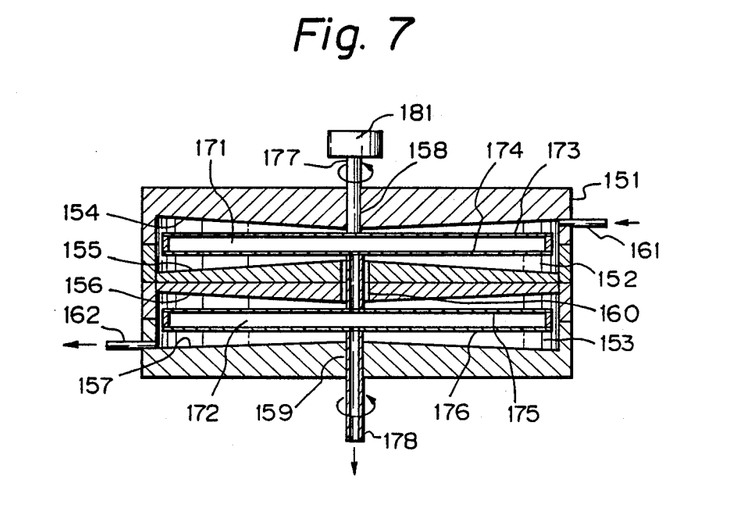

FIG. 6 is a schematic diagram illustrating the longitudinal section of an apparatus according to still another embodiment of the present invention, and FIG. 7 is a schematic diagram illustrating the longitudinal section of an apparatus according to a further embodiment of the present invention.

Referring to FIG. 6, a separating chamber case body 121 having a thin cylindrical shape and having a liquid-treating chamber and a separated liquid chamber in the interior thereof is formed of a polycarbonate.

In the interior of the separating chamber case body 121, a columnar liquid-treating chamber 122 is closed in the state where the liquid is filled and flowed. A part (upper wall surface in FIG. 6) of the inner wall surface of the liquid-treating chamber 122 is a shearing wall surface 123 having a certain area, and in the present embodiment, this shearing wall surface has a conical shape. One end of a liquid introduction path 124 connected to the outside of the separating chamber case body 121 is open to the top of the conical shearing wall surface 123 of the liquid-treating chamber 122, and one end of a liquid discharge path 125 connected to the outside of the separating chamber case body 121 is open to the peripheral side wall of the liquid-treating chamber 122. A rotation shaft-fitting hole 126 connected to the outside of the separating chamber case body 121 is open to the lower wall surface of the liquid-treating chamber 122.

A board-like rotary body 131 is contained in the interior of the liquid-treating chamber 122, and this rotary body 131 comprises a circular plate-like member 132 formed of a polycarbonate, a separating member 133 attached to the top face of the plate-like member 132 to cover the plate-like member 132, and a polycarbonate tube 134 open to the center of the lower face of the concave portion of the plate-like member 132. The separating member 133 comprises a substantially plane perforated plate 135 formed of stainless steel and a separating membrane 136 of a polycarbonate mounted on the perforated plate 135. The concave portion of the plate-like member 132 covered by the separating member 133 defines a separated component chamber 137, and a separating wall surface is defined by the top surface of the separating membrane 136 confronting the shearing wall surface 123. The tube 134 forms a separated component discharge path 138. A rotation driving mechanism 141 is engaged with the portion of the tube 134 forming a part of the rotary body 131, which is located outside of the separating chamber case body 121.

For reference, dimensions of the main parts of the apparatus of FIG. 6 will now be described. This apparatus is especially designed as a means for separating plasma from blood. The angle between the plane rectangular to the central axis of the cone forming the shearing wall surface 123 and the conical surface is a specific angle within the range of from 0.5° to 5°. The diameter of the liquid-treating chamber 122 is about 78 mm, the height of the cone forming the shearing wall surface 123 is about 4 mm, the depth of the concave portion of the rotary body 131 is about 1 mm, and the outer diameter of the rotary body 131 is about 75 mm. The diameter of the separating member 133 is about 112 mm and the thickness is about 22 mm. The thickness of the separating membrane 136 is about 10 μm, the average diameter of the pores is about 0.4 μm, and the fraction of pores is about 13 %. The thickness of the perforated plate 135 is about 0.5 mm. The distance between the top end of the cone forming the shearing wall surface 123 of the liquid-treating chamber 122 and the separating wall surface of the separating membrane 136 is about 0.1 mm.

The operation of the apparatus of FIG. 6 will now be described with reference to the actual operation of separating plasma while collecting blood.

In the apparatus of FIG. 6 a blood-collecting tube (not shown) inserted into the vein of a rabbit (not shown) is connected to a liquid introduction path 124. If necessary, a chemical, for example, an anti-coagulant for blood, is added midway of the blood-collecting tube. Blood introduced into the liquid-treating chamber 122 from the liquid introduction path 124 is filled and fluidized in the liquid-treating chamber 122 and is collected in an appropriate vessel (not shown) through a treated liquid discharge tube (not shown) connected beforehand to the treated liquid discharge path 125. The rotary body 131 is rotated by the rotating driving mechanism 141 and blood continuously supplied to the center of the liquid-treating chamber 122 from the liquid introduction path 124 continuously flows between the shearing wall surface and the separating wall surface, and a rotary movement is given to the blood by the rotating separating wall surface and by this rotary movement, a shear stress is generated between the blood and the separating wall surface. Under the action of this shear stress, the plasma component is caused to pass through the separating membrane 136 and holes of the perforated plate 135 and the plasma component flows in the separated component chamber 137, passes through the separated component discharge path 138 and is continuously collected in an appropriate vessel (not shown) arranged beforehand on the extrusion opening of the separated component discharge path 138. On the other hand, the blood in the liquid-treating chamber 122, that is, mainly the blood from which the plasma component has been separated, passes through the treated liquid discharge path 125 and is continuously collected in an appropriate vessel (not shown) from a treated liquid discharge tube (not shown) connected beforehand to the treated liquid discharge path 125. The main operating conditions are as described below. More specifically, the feed rate of the blood to the liquid introduction path 124 is about 50 ml/min, and the rotation speed of the rotary member 131 is about 3000 rpm.

In FIG. 6, the above-mentioned apparatus is illustrated in the state where the rotation shaft (central axis) is vertical. In practical application, if necessary in order to facilitate discharge of the gas from the apparatus at the initial stage of the operation, the apparatus may be used in the state where the rotation shaft is horizontal, or a gas discharge hole to be used at the start of the operation may be separately formed. In the apparatus according to the present embodiment, the shearing wall surface is a conical surface which is convex to the separating surface and the separating wall surface is a circular plane surface, but other combinations may be adopted. For example, there can be mentioned a combination of the shearing wall surface which is a circular plane surface and the separating wall surface which is a conical surface convex to the separating wall surface, a combination of the shearing wall surface which is a conical surface convex to the separating wall surface and the separating wall surface which is a conical surface convex to the shearing wall surface, a combination of the shearing wall surface which is a circular plane surface and the separating wall surface which is a circular plane surface, and a slight modification thereof. However, the penultimate combination is not preferred where a strict uniformity of the shear stress at the positions in the radial direction of the shearing wall surface is required.

The treating mechanism comprising a pair of one separating wall surface and one shearing wall surface is disposed in the apparatus of the present embodiment, and a plurality of pairs of these treating wall surfaces may be disposed in the apparatus. An apparatus comprising four pairs of the treating wall surfaces is illustrated in FIG. 7.

FIG. 7 is a schematic diagram illustrating the longitudinal section of an apparatus according to a further embodiment of the present invention. Referring to FIG. 7, the apparatus as a whole comprises a cylindrical case body 151 closed at the top and bottom and having a height smaller than the diameter thereof. A first liquid-treating chamber 152 and a second liquid-treating chamber 153 are formed in the interior of the case body 151. Conical wall surfaces 154 and 155 are formed on the top and bottom faces of the first liquid-treating chamber 152, and conical wall surfaces 156 and 157 are similarly formed on the top and bottom faces of the second liquid-treating chambers 153. These wall surfaces 154, 155, 156, and 157 form shearing wall surfaces. At the center of the case body 151, rotation shaft-fitting holes 158 and 159 are formed on the upper and lower faces of the case body 151, and a fluid flow hole 160 is formed on the wall surface of the central portion. Furthermore, in the case body 151 are formed a liquid introduction path 161 connected to the first liquid-treating chamber 152 and a treated liquid discharge path 162 connected to the second liquid-treating chamber 153. A first disc-like case rotary body 171 and a second disc-like case rotary body 172 are arranged in the first liquid-treating chamber 152 and the second liquid-treating chamber 153, respectively. Separating members 173, 174, 175, and 176 are arranged on the upper and lower faces of the first and second case rotary bodies 171 and 172, within which a separated component chamber is formed, and the outer side faces of the separated component chamber form separating wall surfaces. A rotation shaft 177 is secured to the central portion of the upper face of the first case rotary body 171, and the rotation shaft 177 is rotatably fitted to the rotation shaft-fitting hole 158 outside of the case body 151 and is engaged with a rotation driving mechanism 181 through the fitting hole 158. Furthermore, a tube 178 is secured to the central portion of the lower face of the first case rotary body 171, and this tube 178 extends downward, pierces the fluid circulation hole 160, is secured to the second case rotary body 172, pierces the rotary body 172, is rotatably fitted to the rotation shaft-fitting hole 159 outside of the case body 151, and pierces the fitting hole 159. The inner tube path of the tube 178 forms a separated component discharge path, and this tube path is opened and connected to the separated component chamber of the first case rotary body 171 and the separated component chamber of the second case rotary body 172. The structural elements of the apparatus of the present embodiment having the same names as in the apparatus shown in FIG. 6 have substantially the same structure and material as those of the apparatus shown in FIG. 6. In the apparatus shown in FIG. 7, the separating and members 173, 174, 175, and 176 may have the same or different in the structure and material. Moreover, the apex angles of the cones of the wall surfaces 154, 155, 156, and 157 may be the same or different.

In principle, in the apparatus of the present invention, the liquid separating membrane is used, and by a motion imparted to the liquid by the rotary body, a shear rate is produced between the liquid separating membrane and the liquid to separate a predetermined component from the liquid. Accordingly, the area of the separating membrane can be drastically reduced compared with the area of the separating membrane in the above-mentioned conventional apparatus fabricated by using hollow fibers (in the first conventional technique). Note, in order to attain the same capacity, a membrane area of about 1000 to about 3000 cm$^2$ is necessary in the conventional apparatus, but in the apparatus of the present invention, a membrane area of about 50 cm$^2$ is sufficient because a shear rate of about 5000 to about 10000 sec$^{-1}$ is produced Furthermore, in the above-mentioned conventional apparatus of the rotary cylinder type (in the second conventional technique), since the field at which a shear rate acts and the field at which a centrifugal force acts are simultaneously used, reduction in the functions of platelet of blood left after separation of the plasma is extreme. However, in the apparatus of the present invention, since the field for a centrifugal force is not substantially formed, the above-mentioned problem does not arise and no problems arise when the blood left after separation of the plasma is returned to the living body.

Moreover, since the above-mentioned experimental apparatus (in the third conventional technique) used for examining the shear rate in separation of the blood by a conical body is an apparatus exclusively used for experiments, reduction in the size of the apparatus is neither examined, considered nor suggested at all, and the apparatus is an open system. In contrast, in the present invention, the size of the liquid-fractionating apparatus can be surprisingly diminished by adopting a structure in which a disc-like rotary body is used as the rotary body for producing a shear rate and is rotated in a substantially closed small concave portion (liquid-treating chamber), or a disc-like rotary body having a separating wall surface is rotated in the liquid-treating chamber, and a liquid introduction path and a treated liquid discharge path are connected to this substantially closed small liquid-treating chamber so that the liquid to be treated is continuously introduced into the liquid-treating chamber and the treated liquid is continuously discharged from the liquid-treating chamber. Accordingly, an economically advantageous, disposable liquid-fractionating apparatus can be provided for the first time, according to the present invention. Note, in the apparatus of the present invention, sufficient performance can be attained even if the diameter of the apparatus is about 10 cm and the thickness of the apparatus is about 2 cm. This effect is especially important when the apparatus is used as a plasma-collecting apparatus in which the quantity of blood collected from the human body should be reduce to a level as low as possible and the separating chamber 1 should be disposable to prevent infection.

We claim:

1. An apparatus for fractionating a cell suspension which comprises:
    (a) a casing defining an interior space which is substantially closed to the space outside said casing, said interior space comprising a separating chamber disposed in said casing and adapted to contain a cell suspension and including a separated component chamber,
    (b) a separating membrane having a separating surface which is interposed in said casing between the separating chamber and the separated component chamber to separate a predetermined component from said cell suspension and to cause said component to pass therethrough,
    (c) a shearing wall body disposed in said casing having a shearing surface confronting the separating surface of said separating membrane,
    (d) drive means connected to cause relative rotation of said shearing body and said separating surface to apply a shearing force to said cell suspension between said separating membrane and said shearing surface,
    (e) means forming a liquid introduction path to introduce liquid to said separating chamber,
    (f) means forming a treated liquid discharge path to remove treated liquid from said separating chamber, and
    (g) means forming a separated component liquid discharge path connected to the separated component chamber to deliver the separated component.

2. An apparatus for fractionating a cell suspension which comprises:
    (a) a casing defining an interior space which is substantially closed to the space outside said casing, said interior space comprising a separating chamber disposed of in said casing and adapted to contain a cell suspension and including a separated component chamber,
    (b) a separating membrane having a separating surface which is interposed in said casing between the separating chamber and the separated component chamber to separate a predetermined component from said cell suspension and to cause said component to pass therethrough, (c) a rotary body rotatably disposed in said casing having a shearing surface confronting the separating surface of said separating membrane, (d) drive means connected to rotate and drive said rotary body, (e) means forming a liquid introduction path connected to said separating chamber, (f) means forming a treated liquid discharge path connected to said separating chamber, and (g) means forming a separated component liquid discharge path connected to the separated component chamber to deliver the separated component.

3. An apparatus for fractionating a cell suspension which comprises:

(a) a casing having a substantially columnar space in the interior thereof defining an interior space which is substantially closed to the space outside said casing, said interior space comprising a separating chamber disposed in said casing and adapted to contain a cell suspension, (b) means in said space having a shearing surface, (c) a rotary body rotatably disposed in said casing having a separating membrane in said space having a separating surface which confronts said shearing surface, said membrane being disposed to separate a predetermined component from said cell suspension and to cause said component to pass therethrough, and having a separated component chamber in said space adjacent said separating membrane, (d) a driving mechanism engaged to rotate and drive said rotary body, (e) means forming a liquid introduction path connected to said separating chamber for introduction of liquid to be treated, (f) a trated liquid discharge path connected to said separating chamber for delivery of treated liquid, and (g) means forming a separated component liquid path connected to said component chamber for delivery of said separated component.

4. A cell suspension-fractionating apparatus as set forth in claim 1 or 3, wherein the cell suspension is blood and the predetermined component to be separated is plasma.

5. A cell suspension-fractionating apparatus as set forth in claim 1 or 3, wherein the average diameter of the pores of the separating membrane is 0.2 to 1.0 μm.

6. A cell suspension-fractionating apparatus as set forth in claim 4, wherein the average diameter of the pores of the separating membrane is 0.4 to 0.8 μm.

7. A cell suspension-fractionating apparatus as set forth in claim 1 or 3, wherein the separating membrane is composed of a polycarbonate.

8. A cell suspension-fractionating apparatus as set forth in claim 1 or 3, wherein the separating membrane is composed of a cellulose mixed ester.

9. A cell suspension-fractionating apparatus as set forth in claim 1 or 3, wherein the separating membrane is composed of polyethylene.

10. A cell suspension-fractionating apparatus as set forth in claim 1 or 3, wherein the separating membrane is composed of a polysulfone.

11. A cell suspension-fractionating apparatus as set forth in claim 1- or 3, wherein the separating membrane is composed of a ceramic material.

12. A cell suspension-fractionating apparatus as set forth in claim 1 or 3, wherein the area of the separating surface is 10 to 100 cm$^2$.

13. A cell suspension-fractionating apparatus as set forth in claim-1 or 3, wherein each of the separating surface and the shearing surface is a plane surface.

14. A cell suspension-fractionating apparatus as set forth in claim 13, wherein the distance between the separating surface and the shearing surface in 0.05 to 2 mm.

15. A cell suspension-fractionating apparatus as set forth in claim 14, wherein the outer diameter of the shearing surface is 30 to 100 mm.

16. A cell suspension-fractionating apparatus as set forth in claim 1 or 3, wherein one of the separating surface and the shearing surface is a conical surface convex to the other surface.

17. A cell suspension-fractionating apparatus as set forth in claim 16, wherein the crossing angle between the separating surface and the shearing surface is 0.5° to 5°.

18. A cell suspension-fractionating apparatus as set forth in claim 17, wherein the crossing angle between the separating surface and the shearing surface is 0.8° to 3°.

19. A cell suspension-fractionating apparatus as set forth in claim 16, wherein the outer diameter of the shearing surface is 20 to 100 mm.

20. A cell suspension-fractionating apparatus as set forth in claim 16, wherein the separating surface is a plane surface.

21. A cell suspension-fractionating apparatus as set forth in claim 1 or 3, wherein each of the separating surface and the shearing surface is a conical surface convex to the other surface.

22. A cell suspension-fractionating apparatus as set forth in claim 21, wherein the crossing angle between the separating surface and the shearing surface is 0.5° to 5°.

23. A cell suspension-fractionating apparatus as set forth in claim 22, wherein the crossing angle between the separating surface and the shearing surface is 0.8° to 3°.

24. A cell suspension-fractionating apparatus as set forth in claim 21, wherein the outer diameter of the shearing surface is 20 to 100 mm.

25. A cell suspension-fractionating apparatus as set forth in claim 1 or 3, wherein one separating surface and one shearing wall surface are disposed.

26. A cell suspension-fractionating apparatus as set forth in claim 1 or-3, wherein two separating wall surfaces and two shearing surfaces are disposed.

27. A cell suspension-fractionating apparatus as set forth in claim 26, wherein one separating surface is arranged on each of both surfaces of one separated component chamber.

28. A cell suspension-fractionating apparatus as set forth in claim 26, wherein one separating surface is arranged on each of both surfaces of one separating chamber.

29. A cell suspension-fractionating apparatus as set forth in claim 1 or 3, wherein the driving mechanism for rotating and driving the rotary body comprises a driving shaft attached to the rotary body and extended to the outside of the casing and a motor for rotating and driving the driving shaft.

30. A cell suspension-fractionating apparatus as set forth in claim 1 or 3, wherein the driving mechanism for rotating and driving the rotary body comprises a magnetic coupling member mounted on the rotary body and means arranged outside the casing and magnetically connected to the magnetic coupling member to rotate and drive the magnetic coupling member

* * * * *